Dec. 20, 1955  L. GACK  2,727,438
PLANING MACHINE
Filed Aug. 3, 1951  3 Sheets-Sheet 1
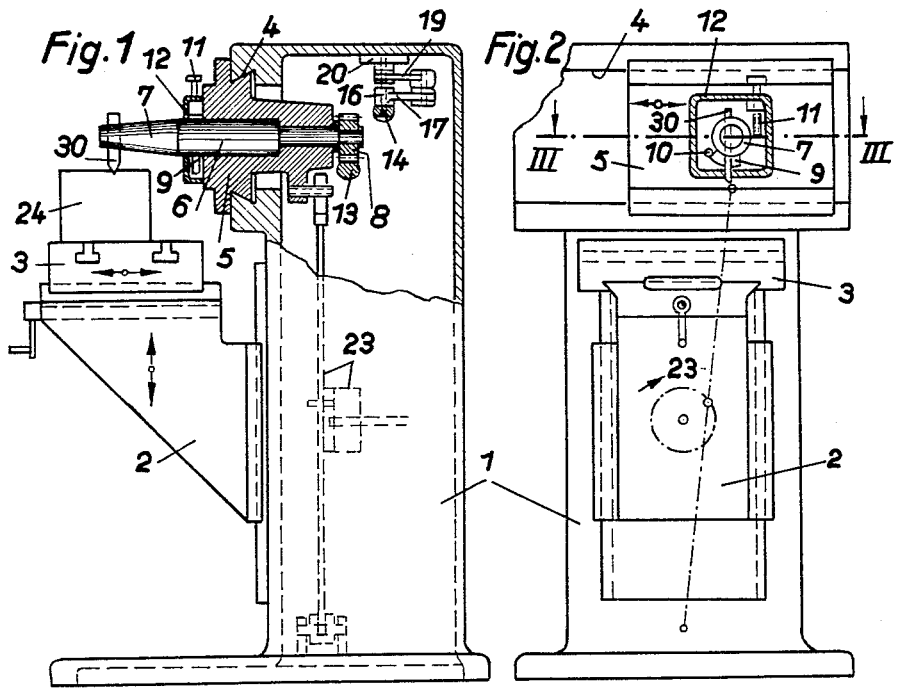
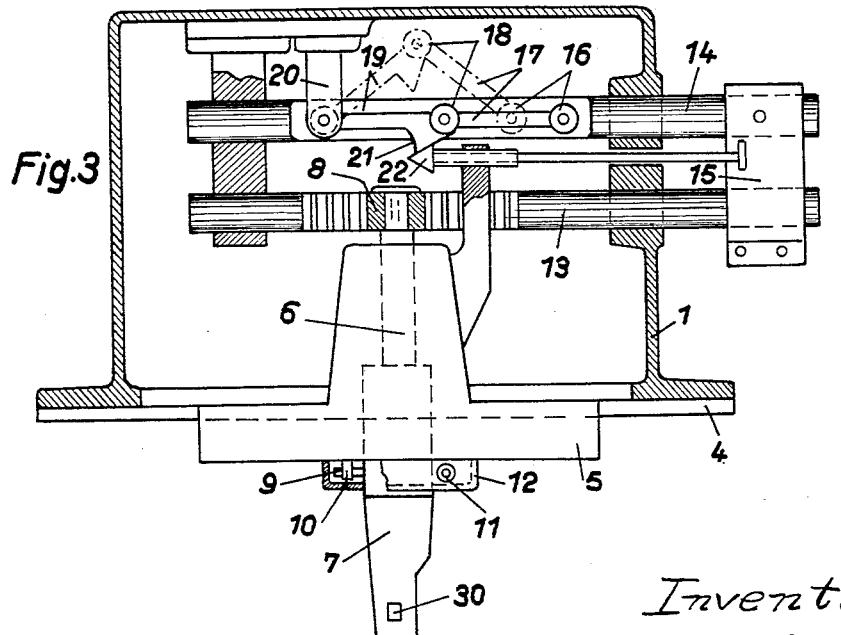
Inventor
Ludwig Gack
By
Young, Emery + Thompson
Attys.

Dec. 20, 1955           L. GACK           2,727,438
PLANING MACHINE
Filed Aug. 3, 1951           3 Sheets-Sheet 2
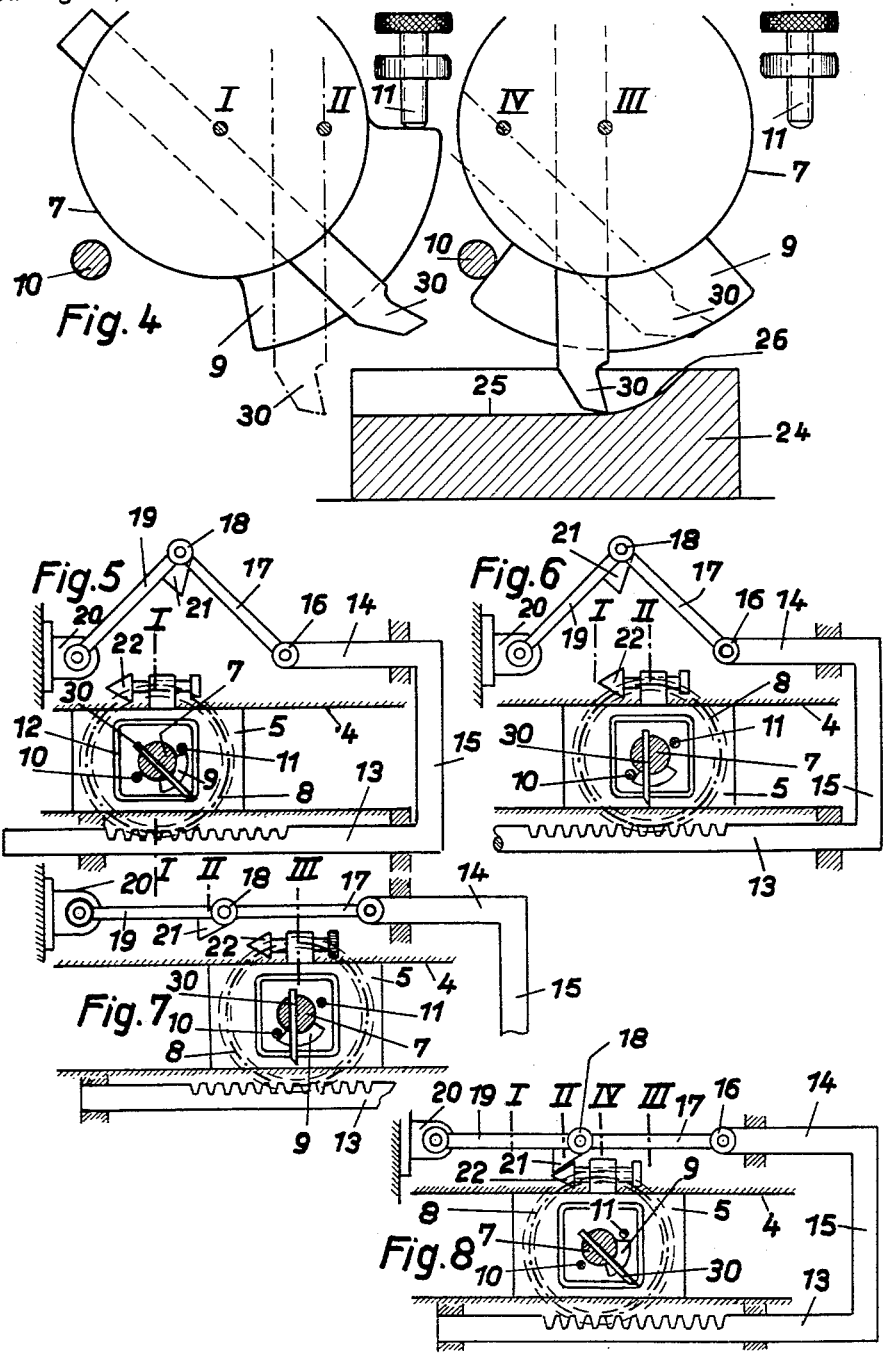
Inventor
Ludwig Gack
By Young, Emery + Thompson
Attys.

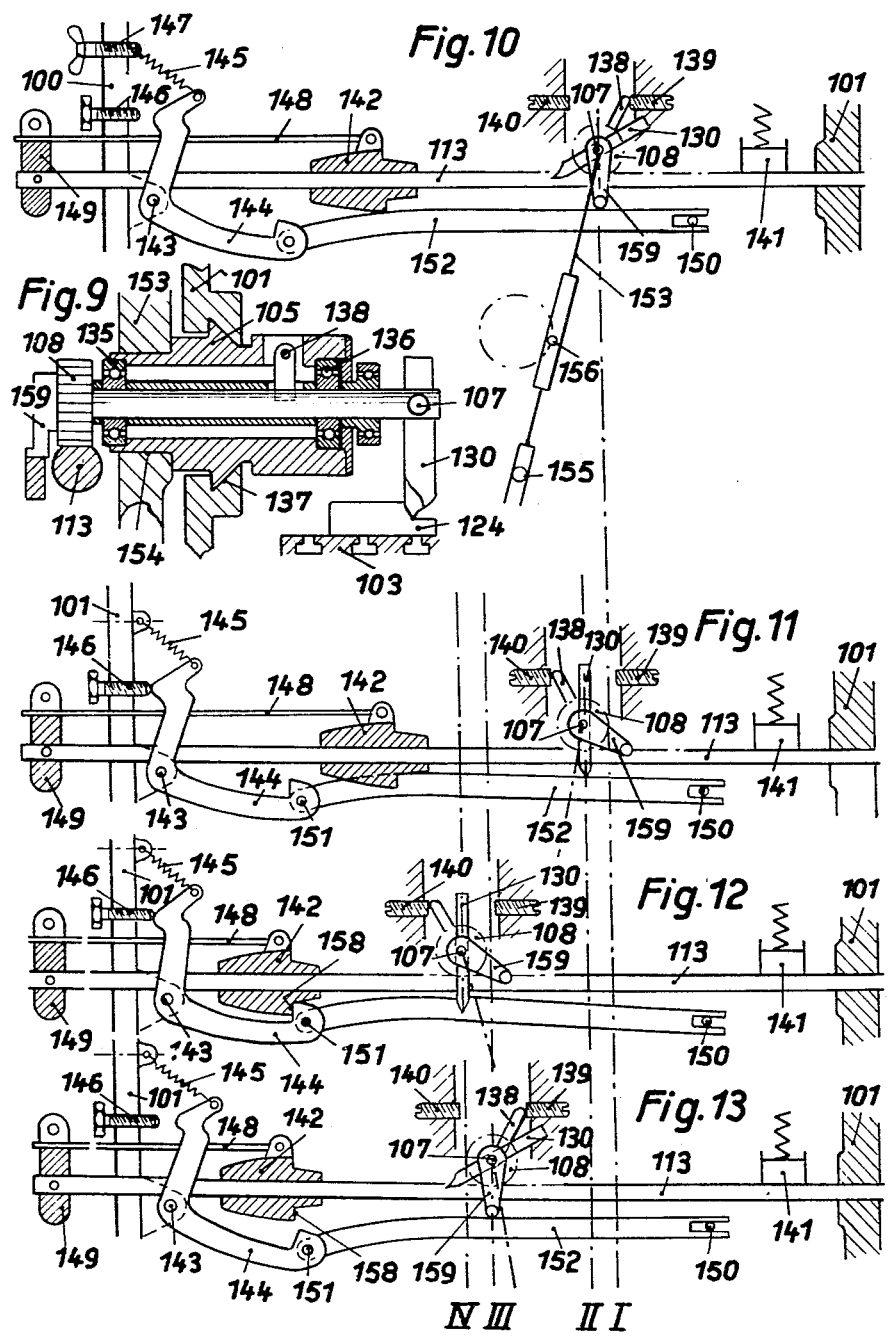

United States Patent Office 2,727,438
Patented Dec. 20, 1955

2,727,438

PLANING MACHINE

Ludwig Gack, Mühlacker, Germany

Application August 3, 1951, Serial No. 240,128

5 Claims. (Cl. 90—38)

The main object of the invention is to machine a fillet adjacent to a straight planing or shaping stroke. Contrary to conventional machines the rotating movement will not be made at the end of the cutting stroke itself, but by special arrangement of a new device at the beginning of the next stroke.

These and other objects and advantages of the invention will appear more clearly in the following specification in connection with the accompanying drawings, in which—

Fig. 1 shows a side elevational view of shaping machine, partially broken,

Fig. 2 a front view of the machine,

Fig. 3 a horizontal section through the machine according to line III—III in Fig. 2 in a larger scale, Fig. 4 an enlarged view of a tool holder in some different positions, Figs. 5 to 8 various stages of operation of a first embodiment of the invention, schematically shown, Fig. 9 a vertical section through the tool carriage of another embodiment of the invention, Figs. 10 to 13 various stages of operation of the second embodiment of the invention shown in Fig. 9, namely, Fig. 10 the machine tool carriage before beginning its forward stroke, Fig. 11 the tool carriage during the straight forward cutting movement of the cutting tool, Fig. 12 shows the sleeve in contact with the pawl, and Fig. 13 the stage when the tool carriage or ram on completion of hollow planing operation initiates the straight backward motion of the tool (idle return motion).

Vertically adjustable on the front side of a planing machine or shaper, 1 is the frame of the machine; 2, 3 is the work holding or clamping device consisting of a lower portion 2 and an upper portion 3. The upper portion is horizontally adjustable along lower portion 2 and the lower portion is vertically adjustable on the machine frame 1.

Horizontally guided in a longitudinal guideway on the upper portion of the front side of the machine is a ram or tool carriage 5.

A shaft 6 is rotatably mounted inside carriage 5, this shaft extends from the front side of the machine and carrying on its outer front end a rotatably mounted tool holder 7 for the cutting or planing tool 30, the tool holder 7 having on its inner end a pinion 8. Rotation of shaft 6 is limited by a lug 9 abutting in clockwise direction against a dog 10 and in opposite direction against a second dog 11. The dogs may be made adjustable. By the clockwise movement the tool 30 will be brought in its working position, by the opposite movement into the idle position. The dogs 10 and 11 are covered by a casing 12. The pinion 8 meshes with a rack 13 longitudinally guided in frame 1 parallel to ram 5. The rack 13 is with its outer end rigidly connected by means of a clamping device to a second rod 14 to which is linked one arm 17 of a toggle lever mechanism 17, 18, 19. The second arm 19 of the toggle lever mechanism is linked with a stationary support 20. The toggle lever device 17, 18, 19 is provided with a protruding nose 21, which nose in the straightened position of the toggle lever cooperates with stop 22—engaged by the returning ram 5 and being adjustable from the outside of the frame—to bring the toggle lever mechanism from its straightened (Figs. 7 and 8) to its angular (Figs. 6 and 5) position. Drive of the ram 5 is by any known means, e. g. by a rocker arm 23 (Figs. 1 and 2).

The operation of the machine is as follows:

For the purpose of better understanding it is supposed that ram 5 is at the forward or working stroke in the position shown by I in Fig. 4. The tool holder 7 is then in such a position that tool 30 is in an inclined position above the work piece 24 clamped on worktable 2, 3 lug 9 of shaft 6 hereby abutting stop 11. If ram 5 is moved in the direction of its forward working stroke towards the righthand side, the pinion 8, meshing with rack 13, rolls along rack 13, thus effecting a rotation of shaft 6 connected therewith. As soon as lug 9 of shaft 6 abuts abutment 10, rotation of shaft 6 is stopped. Now the pinion 8 forcibly takes along with itself rack 13, thus effecting a rigid connection of rack 13 with ram 5 (see position II in Fig. 4, and Fig. 6). By the described rotation of shaft 6 the tool 30 is brought in its vertical cutting position (position III in Fig. 4, and Fig. 7) where it remains until the end of the working stroke thus performing its straight cutting operation 25. After ram 5 has reached the end of its forward working stroke, the toggle lever mechanism 17, 18, 19 has simultaneously been brought into its straightened position (Figs. 3 and 7) by rack 13 and rod 14 coupled together. When the return movement of ram 5 begins now, rack 13 is prevented from accompanying the backward movement of the ram 5 by the toggle lever remaining in its straightened position. Therefore pinion 8 now rolls along rack 13 and imparts an anti-clockwise rotation to shaft 6 with its tool holder 7. Hereby cutting or shaping tool 30 describes a circular upwardly directed cutting movement until lug 9 abuts stop 11. By this movement tool 30 produces on workpiece 24 a desired fillet 26 (Fig. 4 position IV, and Fig. 8), i. e. a hollowing planing operation takes place. As the abutment 11 now prevents the shaft 6 from further rotation, the pinion 8, connected with the latter, forcibly takes rack 13 with it to its inner dead point position (Fig. 5). This is, however, only possible because the dog 22 provided on ram 5 has in the meantime abutted nose 21 of toggle lever mechanism 17, 18, 19, thereby forcing it out of its straightened position (Fig. 8) in such a manner, that the toggle lever mechanism now can move in angular position so that the rack 13 can be moved to the left. At the end of the return stroke (Fig. 5) the described cycle of operation starts anew.

The operating parts of the machine as described above can naturally be replaced by other parts functioning in a similar manner, e. g. the toggle lever mechanism 17, 18, 19 could be substituted by a pawl and ratchet device. Instead of rack 13 and pinion 8 a longitudinally slidable rod could be used which is in a slot-and-pin connection with a lever mounted on shaft 6. The device according to the invention can also be mounted as a unit on shapers or planing machines already in use. If required, the unit can also be mounted on a guideway 4 being in a certain inclined position as compared with the horizontal type.

In another embodiment of a horizontal small-size shaper, 101 is a partially shown machine housing, 103 its horizontal worktable, 124 a workpiece thereon, and 130 a shaping tool rotatably arranged in the axle 107 of a tool holder. Axle 107 runs on anti-friction bearings 135, 136. 105 is the ram longitudinally guided in a horizontal direction in a vertical direction guideway 137 of the machine housing 101. The front face of the housing, contrary to conventional horizontal shapers, is vertical and the top of the work table 103 in front of it is horizontal. Into a recess of ram 105 the latter extending beyond the front of the work table reaches a dog 138 rigidly mounted on the tool holder 107. The dog 138 cooperates in the one direction with an abutment 139 and in the opposite direction with another abutment 140 of ram 105, thereby limiting the rotating motion of tool holder 107 and tool 130. This will be described in detail in the following explanation of Figs. 10 to 13.

108 is a pinion mounted on tool holder 107, and 113 is a meshing therewith. The rack can be reciprocated in supports of the side walls of the housing 101 against the friction of a brake 141 schematically shown in the drawing. 142 is a locking sleeve which can according to Fig. 12 cooperate with a pawl 144 rotatably mounted on a stationary pivot 143. In the position according to Figs. 10 and 11 the upper arm of the pawl 144 rests under the tension of a spring 145 on an adjustable stop 146 of the machine housing. Spring 145 can also be of the adjustable type by means of screw 147 in Fig. 10. Locking sleeve 142 is adjustably coupled with a rod 113 by a rod 148 guided in the side wall of the machine. The rods 113 and 148 are coupled to each other by clamping means 149. Rod 148 could also in a manner not shown be arranged in a longitudinal hole of rod 113. Pawl 144 can be disengaged by an abutment lever 159 which is fastened on axle 107 of the tool holder. The abutment lever 159, in its position according to Figs. 10 and 13 has displaced an intermediate lever 152 rotatably mounted on a fixed stud 150 and on a stud 152 of pawl 144, out of its starting position determined by spring 145. 153 is a rocking arm rotatably mounted on a fixed stud 155 of the housing 101 and engaging with its upper end at 154 directly a ram 105. 156 is a crank stud which at each rotation of the drive shaft of the machine moves once along the dash-and-dotted circle shown in the drawing by adjusting stud 156 away from the center of the circle, the stroke of the rocking lever can be increased, or vice versa.

The rocking lever 153 when moved from position I, causes a rolling movement of the pinion 108 along rack 113 in anti-clock-wise direction (Fig. 10) as long as brake 141 has sufficient power to hold rod 113. During this movement the dog 138 moves away from abutment 139 and the tool 130 rotates from the position according to Fig. 10 to that according to Fig. 11. This rotation is interrupted by the dog 138 reaching the other abutment 140. Further, by the said rotation the spring 145 brings the abutment lever 159 from position according to Fig. 10 in which the intermediate lever 152 is in its lower position, into the position according to Fig. 11. During this movement pawl 144 slides along locking sleeve 142.

After the ram 105 has on its leftward movement reached the position according to Fig. 12, the dog 138 stopped by abutment 140 does not allow the tool holder 107 to continue moving in its anti-clockwise direction. Now the pinion 108 is prevented from further rotating. The dog 138 consequently is held in touch with abutment 140 of the longitudinally moved ram 105, on the other end, however takes the rack 113 by the arrested pinion 108 with itself towards the left. The tool, the cutting edge of which now points vertically downwards, shapes or planes between positions II and IV a straight strip from workpiece 124. This straight portion of the stroke is stopped in position IV, corresponding to the left-hand dead center position of ram 105. In this position according to Fig. 12, the pawl 144 having slid along the outside of locking sleeve 142 snaps into nose 158 of sleeves 142.

During return motion of ram (rightwards in the drawing) caused by rocking arm 152, axle 107 of tool holder is transported to the right. As, however, rod 113 is held in position by pawl 144 engaging sleeve 142, the rack 113 can not follow the rightward motion of ram 105. The arrested rack 113 can therefore not be displaced by pinion 108 meshing with it, so that during the further movement of the tool holder 107 pinion 108 is forced to roll along on the arrested rack 113, thereby rotating the cutting tool 130 from the position according to Fig. 12 into that according to Fig. 13. By that rotating movement the shaping tool 130 is forced to cut, directly upon reversing of ram 105, a fillet in close continuation to the plane surface cut during the forward stroke of ram. Tool 130 thereby moves into its Fig. 13 position, whereby the end portion of the rotation movement is no longer in touch with the work-piece (idle portion). During the idle portion of the stroke the abutment lever 159 has, as schematically shown in the drawing, swung down against intermediate lever 152, thereby disengaging pawl 144. Rack 113 is, therefore, during the last portion of the rotation of the planing tool 130 no longer held by pawl 144, but only by means of brake 141 in its left end position until finally the dog 138 has reached the right-hand side abutment 139.

When the ram 105 now continues to be moved backwards towards the right, the pinion 108 locked at abutment 139, 140 with the planing tool 130 swung upwards out of operation, pulls rack 113 against the effect of brake 141 towards the right whereby planing tool is clear of work piece surface and prevents effectively the tool holder to be further swung out until position I has been reached. Further cycles can be performed in the manner described.

The new device is of simple design and of reliable operation. Manufacturing costs are low, and the device can easily be used with machines already in use. Attachment on existing conventional shaping machines is made particularly easy, because no special drive for hollow planing is required and because all movements can be taken from the reciprocating movement of the ram.

Having thus fully described my invention, what I claim as new and desire to secure by Letters Patent, is:

1. A shaping machine, comprising a machine frame, a work table supported on the frame adapted to receive a work piece, a reciprocating tool slide having a tool holder carrying a shaping tool adjustably mounted therein, driving means in the frame for reciprocating said slide, said tool holder being rotatably mounted in the tool slide about an axis at right angles to the reciprocating movement of the slide, a sliding rod mounted to reciprocate in the machine frame in the same directions as movement of the tool slide, the tool holder being connected to the sliding rod so that rotation of the holder causes longitudinal movements of the sliding rod, stop means with abutments for limiting the rotation of the tool holder in its two opposite end positions relative to the tool slide, and arresting means between the sliding rod and the machine frame which for the first portion of each stroke of the tool, prevents the sliding rod from being moved so that the tool holder can move from one abutment of said stop means to the other, and which, for the end portion of each stroke of the tool slide permits the sliding rod to take part in the movement of the tool slide.

2. A shaping machine, comprising a machine frame, a work table supported on the frame adapted to receive a work piece, a reciprocating tool slide having a tool holder carrying a shaping tool adjustably mounted therein, driving means in the frame for reciprocating said slide, said tool holder being rotatably mounted in the tool slide about an axis at right angles to the reciprocating movement of the slide, a sliding rod mounted to reciprocate in the machine frame in the same directions as movement of the tool slide, the tool holder being connected to the sliding rod so that rotation of the holder causes longitudinal movements of the sliding rod, stop means with abutments for limiting the rotation of the tool holder in its two opposite end positions relative to the tool slide, arresting means between the sliding rod and the machine frame which for the first portion of each stroke of the tool, prevents the sliding rod from being moved so that the tool holder can move from one abutment of said stop means to the other, and which, for the end portion of each stroke of the tool slide permits the sliding rod to take part in the movement of the tool slide, and brake means provided to assist the arresting means.

3. A shaping machine, comprising a machine frame, a work table supported on the frame adapted to receive a work piece, a reciprocating tool slide having a tool holder carrying a shaping tool adjustably mounted therein, driving means in the frame for reciprocating said slide, said tool holder being rotatably mounted in the tool slide about an axis at right angles to the reciprocating movement of the slide, a sliding rod mounted to reciprocate in the machine frame in the same directions as movement of the tool slide, the tool holder being connected to the sliding rod so that rotation of the holder causes longitudinal movements of the sliding rod, stop means with abutments for limiting the rotation of the tool holder in its two opposite end positions relative to the tool slide, arresting means between the sliding rod and the machine frame which for the first portion of each stroke of the tool, prevents the sliding rod from being moved so that the tool holder can move from one abutment of said stop means to the other, and which, for the end portion of each stroke of the tool slide permits the sliding rod to take part in the movement of the tool slide, and the stop means being provided with a stop arm fixed to the tool holder and swingably arranged on the tool slide between two abutments.

4. A shaping machine, comprising a machine frame, a work table supported on the frame adapted to receive a work piece, a reciprocating tool slide having a tool holder carrying a shaping tool adjustably mounted therein, driving means in the frame for reciprocating said slide, said tool holder being rotatably mounted in the tool slide about an axis at right angles to the reciprocating movement of the slide, a sliding rod mounted to reciprocate in the machine frame in the same directions as movement of the tool slide, the tool holder being connected to the sliding rod so that rotation of the holder causes longitudinal movements of the sliding rod, stop means with abutments for limiting the rotation of the tool holder in its two opposite end positions relative to the tool slide, arresting means between the sliding rod and the machine frame which for the first portion of each stroke of the tool, prevents the sliding rod from being moved so that the tool holder can move from one abutment of said stop means to the other, and which, for the end portion of each stroke of the tool slide permits the sliding rod to take part in the movement of the tool slide, the tool holder being provided with a shaft the axis of which is horizontally and rotatably arranged in the tool slide, and a pinion on the end of the tool holder opposed to the tool, the slide rod being provided with a toothed rack so that the latter will mesh with the pinion and the cutting edge of the tool being directed towards the rack as viewed from the axis of rotation of the tool holder.

5. A shaping machine, comprising a machine frame, a work table supported on the frame adapted to receive a work piece, a reciprocating tool slide having a tool holder carrying a shaping tool adjustably mounted therein, driving means in the frame for reciprocating said slide, said tool holder being rotatably mounted in the tool slide about an axis at right angles to the reciprocating movement of the slide, a sliding rod mounted to reciprocate in the machine frame in the same directions as movement of the tool slide, the tool holder being connected to the sliding rod so that rotation of the holder causes longitudinal movements of the sliding rod, stop means with abutments for limiting the rotation of the tool holder in its two opposite end positions relative to the tool slide, arresting means between the sliding rod and the machine frame which for the first portion of each stroke of the tool, prevents the sliding rod from being moved so that the tool holder can move from one abutment of said stop means to the other, and which, for the end portion of each stroke of the tool slide permits the sliding rod to take part in the movement of the tool slide, the tool holder being provided with a shaft the axis of which is horizontally and rotatably arranged in the tool slide, and a pinion provided on the end of the tool holder opposed to the tool, the slide rod being provided with a toothed rack so that the latter will mesh with the pinion and the tool slide extending with its one end supporting the tool over the work table arranged on the outside of the machine frame and extending with its other end supporting the pinion in the interior of the machine frame, and the end of the tool slide extending into the interior of the frame being engaged by the reciprocating drive of the machine.

References Cited in the file of this patent

UNITED STATES PATENTS

| | | |
|---|---|---|
| 1,485,162 | Bonom | Feb. 26, 1924 |
| 2,105,237 | Welch | Jan. 11, 1938 |
| 2,475,577 | Berthiez | July 5, 1949 |
| 2,480,028 | Jones et al. | Aug. 23, 1949 |
| 2,618,203 | Hyman | Nov. 18, 1952 |